INVENTORS.
Michel A.J. Legrain &
André François Legourd
by Sparrow and Sparrow

ATTORNEYS.

INVENTORS.
Michel A.J. Legrain &
André François Legourd
by Sparrow and Sparrow
ATTORNEYS.

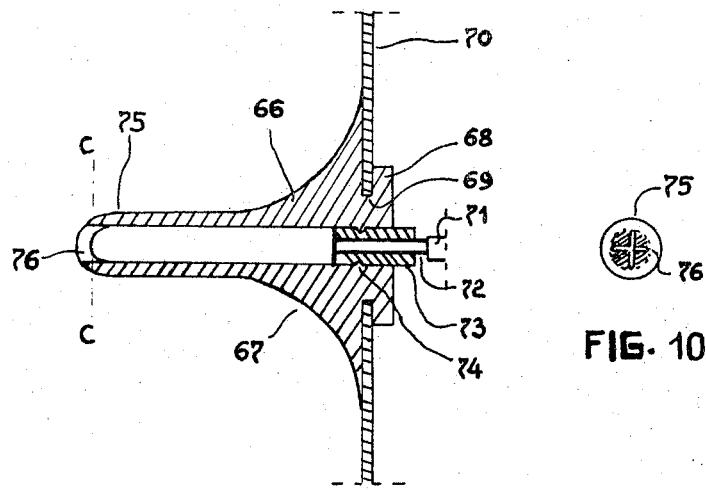
FIG. 9
FIG. 10
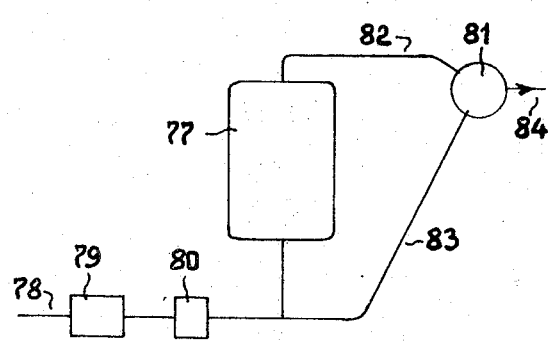
FIG. 11

United States Patent Office 3,331,357
Patented July 18, 1967

3,331,357
APPARATUS FOR THE MIXING AND FEEDING OF LIQUID FOOD TO SUCKLING ANIMALS
Michel Aimé Joseph Legrain, Foulbec, France, and André François Legourd, 8 Rue Louis-Duperrey, Thiais, France
Filed Aug. 17, 1965, Ser. No. 480,330
Claims priority, application France, Aug. 17, 1964, 7,060; Jan. 10, 1965, 1,515
4 Claims. (Cl. 119—71)

The present invention relates to an automatic apparatus, intended for feeding animals, particularly calves, the said apparatus comprising a mixing container which receives powder and liquid, such as powdered milk and water, and wherein the liquid is admitted, during the operation of the mixer in the mixing container, so that it forms an annular vein into which the powder is introduced.

According to our invention, at least one part of the device ensuring the supply of powder to the mixer is actuated independently.

According to our invention also, the putting into operation and the stopping of the mixer are controlled by the variation of the weight of the mixture contained in the mixer.

Our invention also consists in fitting the hopper, containing the powder to be introduced, with a flexible rotating member ensuring a regular flow of the powder.

Our invention further consists in providing the apparatus with teats adapted to the action of the animal being fed.

Our invention also consists in certain other arrangements hereinafter mentioned and used preferably at the same time as the main arrangements hereinabove mentioned.

Our invention particularly covers certain modes of application and realization of the said arrangements and also the apparatus provided with such improvements.

In order that the invention may be more clearly understood, reference will now be made to the accompanying drawings which show some embodiments thereof by way of example and in which:

FIGURE 9 shows a view in longitudinal section of a teat for fitting to the apparatus, FIGURE 10 shows a section of FIGURE 9 through the plane C—C, and FIGURE 11 shows a system of heating the water of the apparatus.

Figure 1:
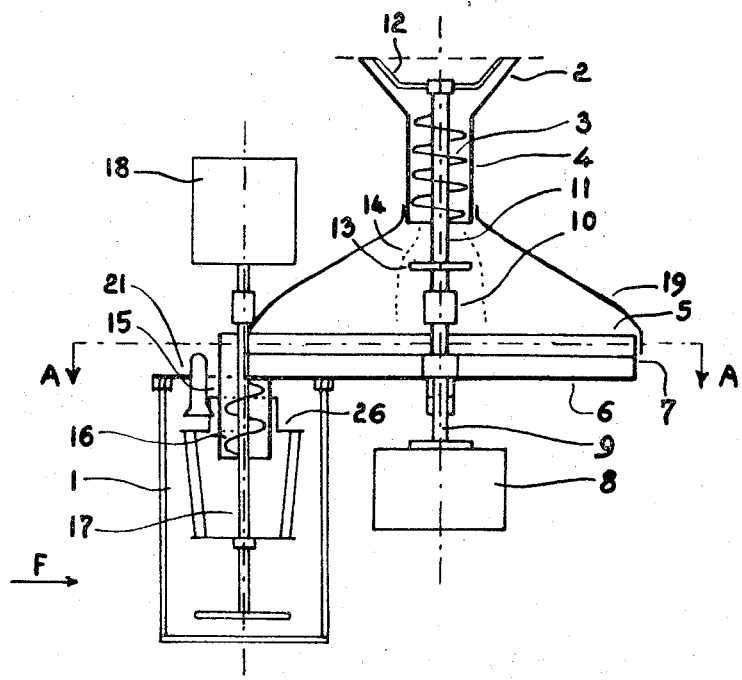
FIGURE 1 shows a section, through a vertical plane, of an apparatus according to the invention.
Figure 2:
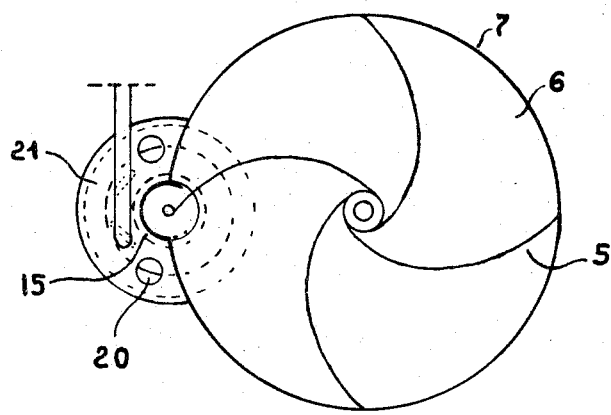
FIGURE 2 shows a section through the plane A—A of FIGURE 1.
Figure 3:
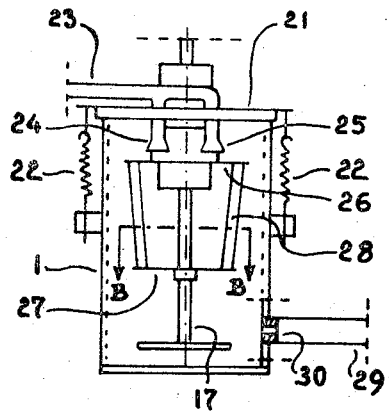
FIGURE 3 shows an elevation along the arrow F of FIGURE 1 of the mixer of this apparatus.

If it is proposed to produce, according to the invention, an apparatus for feeding animals, and more particularly methods for the application thereof as well as its various embodiments, and its various parts, to which it seems preference must be given, the apparatus is used in the following, or a similar manner.

The powder, for introduction into a mixing container 1 of the apparatus, is contained in a hopper 2, the lower part only of which is visible on the drawing. An Archimedian screw 3, arranged to rotate in a spout 4, ensures and regulates the flow of the powder from the hopper 2 to a distribution constituted by one or more flexible, spiral shaped blades 5, rotating on a flat base 6 fitted with a raised edge 7. In accordance with the invention, a motor 8, which may be electrical and fitted with reducing gear, actuates in an independent manner the shaft 9 integral with or secured to the blades 5. By means of a suitable joint 10, easily dismountable and suitable for remedying any differences in alignment, the shaft 9, drives the shaft 11 of the screw 3. This shaft 11 also actuates a scraping member 12 located in the hopper 2. If necessary the scraper 12 may be replaced by a plate which is free to rotate about a pivot fixed to the shaft 11 and thrown off centre with respect to this shaft. A deflector 13 prevents the powder, which is falling at 14, from reaching the joint 10.

The powder coming from the spout 4 is collected on the base 6 of the distributor. The rotation of the blades 5 drives the powder to the outside edge 7. The powder is retained by the raised edge 7 except at the location of the spout 15 where it is introduced into mixing container 1 by an Archimedian screw 16 mounted on a shaft 17 of the mixer. The shaft 17 is driven by a motor 18, for example an electric motor. This motor is separate from the motor 8.

The motors 8 and 18 are switched on and stopped, as has been previously described, by variations in the level or of the hydrostatic pressure within the mixing container 1. The control of the motor 18 may be delayed so that the stopping of this motor is effected after the stopping of the motor 8. Moreover, the motors 8 and 18 may be stopped by any known means, in the case where the general supply of the apparatus has no liquid. This security may be completed by an audible and/or visual alarm device.

A sleeve or hood 19, made of textile or plastics material, is arranged between the spout 4 and the raised edge 7 in order to avoid any undesirable losses of powder.

So that the mixing container 1 is under ambient pressure, vents 20 are made in an extension 21 of the base 6, covering the mixing container. The mixing container is supported by springs 22 to this extension 21. This support enables the mixing container to be rapidly assembled or taken to pieces.

Figure 4:
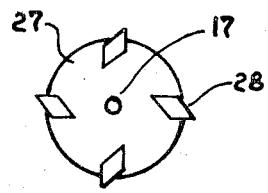
FIGURE 4 shows a section through the plane B—B of FIGURE 7.
Figure 7:
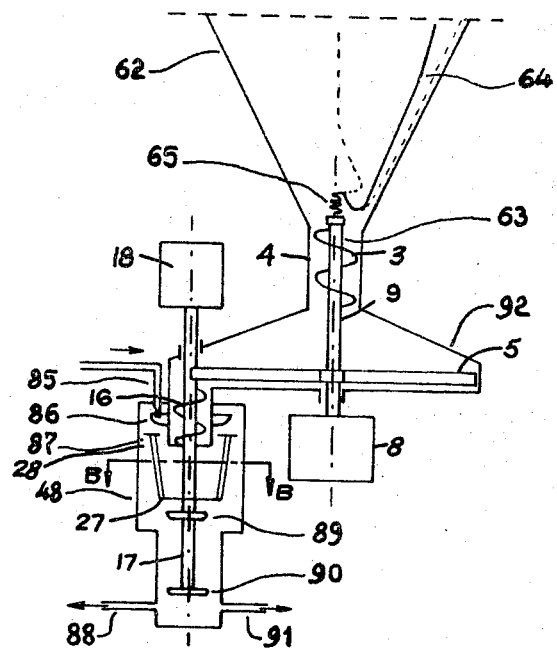
FIGURE 7 shows a part-section through a vertical plane of a modification of the apparatus.

Preferably, the liquid, admitted into the mixing container 1 through a pipe system 23, is introduced through two or more delivery tubes 24, 25, or 85, in FIG. 7, from whence it flows on to a spinning ring 26 or 87 in FIG. 7. This ring is fixed to a disc 27, carried by the shaft 17, by blades 28 inclined as shown on FIGURE 4 and FIG. 7. The inclination of blades 28 (see FIG. 4) is of such design that the rotation of the assembly consisting of spinning ring 87, discs 26 and 27 and blades 28 on shaft 17 (FIG. 7) throws the liquid outwardly against the wall of containers 1 and 48 by the centrifugal force, thus leaving an open annular vein into which the powder is fed by screw 16. In this manner a fast and thorough dissolving and mixing operation is performed.

The liquid product, sucked by the animal, and supplied by the apparatus, leaves the mixing container 1 through one or more pipe systems, such as 29, connected to the mixing container by a diaphragm screen 30 opposing the passage of particles or fragments which may obstruct the pipe system or systems 29.

Figure 5:
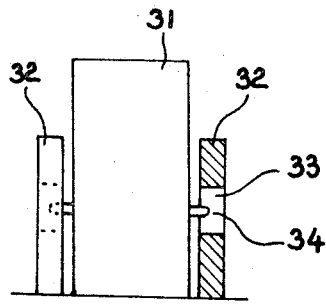
FIGURE 5 shows on a small scale an installation of the apparatus.
Figure 6:
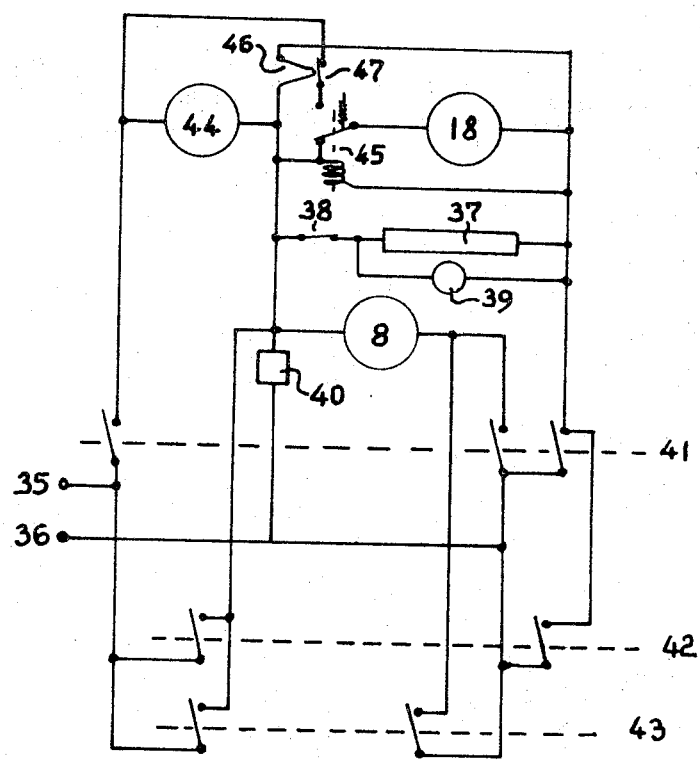
FIGURE 6 shows a diagram of the electrical connections of the apparatus.

In order to protect the apparatus, shown at 31, on FIGURE 5, from shocks possibly produced by the animals coming to take their food, it is protected by independent and sufficiently robust partitions 32, cut away at 33 about the teats 34.

The apparatus according to the invention is ordinarily provided in order to operate electrically by connection to the mains supply. After a circuit breaker (not shown) which may be disconnectable by a lack of liquid supply, the current arrives at the terminals 35, 36 to be fed to the motor 8 of the powder distributor, the motor 18 of the mixing container and to the elements 37 heating the liquid, these elements being controlled by a thermostat 38 and checked by a pilot lamp 39, and to an electrically-operated valve 40 admitting the liquid into the mixing container.

A tripolar circuit breaker 41 and bipolar circuit breakers 42 and 43 serve to obtain three operations of the apparatus: normal running, washing of the mixing container, dosing of the mixing container.

In normal running, corresponding to the feeding of the animals, the circuit breaker 41 is closed and the circuit breakers 42 and 43 are open. The motors 8 and 18, the heating elements 37 and the electrically-operated valve 40 are energised by the closing of a contact connected to a manometric device 44, subjected to the hydrostatic pressure of the mixing container, when this pressure falls below a certain value. When the said pressure exceeds another value, and the level in the mixing container is raised the contact of the device 44 opens: the motors and heating are stopped and the electrically operated valve is closed.

If desired, the mixer motor 18 may be stopped after the powder distributor motor 8 by energising, the motor 18 through a relay 45 and a time switch 47, opening on the cooling of a thermal switch 46. The motor 8 stops at the opening of the contact of the device 44, the relay 45 comes to rest and supplies the motor 18 through the switch 47. When the thermal switch 46 through which the current does not pass, is sufficiently cooled, the switch 47 opens and the motor 18 stops.

In order to wash the mixing container, the switch 42 is closed by keeping circuit breakers 41 and 43 open, which switches on the motor 8, the elements 37 and the electrically-operated valve 40. The mixing container 1 is thus washed in hot water.

The dosing of the mixture is effected by withdrawing the mixing container 1 and by measuring the amount of powder introduced by the distributor during the flow of a specific quantity of liquid. In order to effect this dosing, the circuit breaker 43 is closed, leaving breakers 41 and 42 open; the motor 8 of the powder distributor and the electrically-operated valve 40 thus operate.

Figure 8:
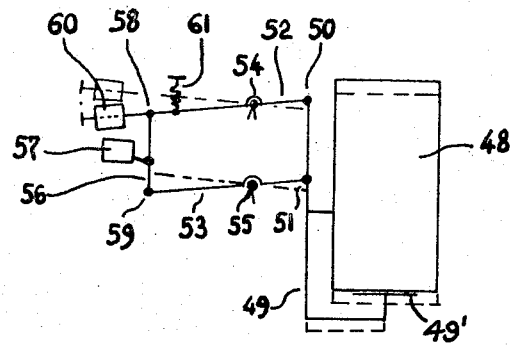
FIGURE 8 shows the assembly of the container of the mixer of this modification.

According to another embodiment as shown schematically in FIG. 8, container 48 for the mixer of the apparatus, receiving the powder and the liquid to be mixed, is carried by a plate 49′ supported by a vertical rod 49 which is articulated by joints 50, 51, on parallel beams 52, 53 which may pivot about fulcrums 54, 55, located on the stationary frame of the apparatus. A vertical rod 56, connected to an electric contactor 57, is articulated at 58 and 59 to beams 52, 53 and a counterweight 60 which is movable on the upper beam 52, ensures the desired balance of container 48 and of a certain quantity of the mixture contained in this container. If the mixture in question is lighter or heavier in weight than this quantity, counterweight 60 raises or lowers container 48 and rod 56 actuates contactor 57. When the weight of the mixture has diminished due to the amounts taken by the animals, fed by the apparatus, contactor 57 switches on the mixer as has been previously explained. When the level again rises in mixing container 48 and the weight increases, beams 52, 53 move and contactor 57 stops the operation of the mixer. In order to obtain a complete operation, contactor 57 is arranged in a biasable trigger circuit having a spring, which is preferably adjustable.

By acting on the tension of a spring 61, the operation of the mixer may also be adjusted.

In order to ensure a regular flow of the powder contained in a hopper 62, a shaft 63 of an Archimedian screw, located at the base of this hopper, drives a rotatable member 64, in the form of a bent wire, fixed resiliently at 65 to the shaft 63. The elasticity of the fixture 65, which may be constituted by a coil spring, and its own elasticity enables the member 64, normally applied to the wall of the hopper 62, to move in the hopper towards the points offering the minimum resistance to its rotation. Experience shows that this movement is favourable for a good flow of the powder.

In accordance with the invention, the apparatus is fitted with teats adapted to the action of the animal being fed. Thus a teat 66, shown in FIGURES 9 and 10, has an external shape, the curve 67 of which corresponds in shape to that of the tongue of the animal coming to take its feed. The animal may, in this way, effect pressure on the teat, which is natural to it, in order to obtain its milk. The teat 66 is made of a flexible material, such as rubber; a raised edge 68 and a groove 69 enable it to be fixed into a wall 70. The liquid food is guided into the teat through a flexible tube 71, the end of which is connected to a rigid tube 72 fixed in a sleeve 73 made of plastics material, such as a methacrylic resin. The sleeve 73 is held by a tape or card within the teat and locating in the groove 74. At the end 75 of the teat, the liquid passage has a cross-shaped section 76.

Preferably, the hot water used in the apparatus is obtained by mixing, with cold water, of water whose temperature is quite high, for example 70° C., supplied from the water heater 77. The cold water, coming from the mains, arrives at 78 and passes through a pressure regulator 79, and a safety device 80 for stopping the apparatus if there is no water. A thermostat valve 81, connected to the hot water pipe system 82 and cold water pipe 83, regulates the temperature of the mixture which is taken to a temperature of about 38° C. by a pipe system 84 to container 48 of the mixer. Water coming from pipe 84 is admitted to the mixing container through a single inlet 85 dipping in a fixed annular trough 86. The trough overflows on to the centrifuging ring 87.

In a modification, the mixing container may also receive very hot water at its upper part, in order to assist in the dissolution of certain powders, and cold water at its lower part, through the pipe system 88, in order to bring back the mixture to a temperature suitable for the animals. A double agitator 89, 90 ensures the homogenisation of the mixture guided at 91 to the teats.

The mixing container may also be supplied with ionised water, by incorporating the apparatus with a system giving water of this type.

Of course, the apparatus must be electrically insulated due to the addition of this water.

Finally, the mechanism distributing the powder to the mixing container may be protected by a sealing cover 92.

It will be well understood that the invention is not limited to the methods of application and embodiments indicated, but extends to any suitable modifications thereof. For example it could be used for feeding human beings.

What we claim is:

1. Feeding apparatus, particularly for feeding of animals, comprising: a mixing container for receiving a liquid and a powder, such as water and powdered milk, a power driven rotating mixer in said container, said mixer having inclined blades, means for admitting said liquid to said mixer in said container during the operation of said mixer and means in said container for forming an annular vein of liquid on the wall of said container into which said powder is introduced, an independently actuated powder supply device, balancing feed control means vertically moving said mixing container and said mixer therein, said balancing feed control means consisting of a system having pivoting parallel beams, and an electric contactor actuated by said system, said contactor switching said power on and off for said rotating mixer.

2. Feeding apparatus, according to claim 1, and said powder supply device comprising a hopper, a flexible member rotatable in said hopper, an Archimedian screw having a shaft, and a distributor having blades.

3. Feeding apparatus, according to claim 2, and said flexible rotatable member comprising a bent wire and a spring, said spring and said wire secured to the shaft of said Archimedian screw.

4. Feeding apparatus, according to claim 1, and comprising at least one take-off point for said liquid and powder mixture, and at least one a teat having a curved external shape and a cruciform passage for said liquid mixture for said animals to be fed.

References Cited
UNITED STATES PATENTS

| | | | |
|---|---|---|---|
| 3,037,481 | 6/1962 | Kloss | 119—71 |
| 3,042,000 | 7/1962 | McMurray et al. | 119—20 |
| 3,042,002 | 7/1962 | Liell | 119—71 |
| 3,081,738 | 3/1963 | Heron | 119—71 |
| 3,090,355 | 5/1963 | Gains | 119—71 |
| 3,115,117 | 12/1963 | Brelsford | 119—56 |
| 3,208,431 | 9/1965 | Kloss | 119—51.11 |
| 3,216,397 | 11/1965 | Pickard | 119—71 |

SAMUEL KOREN, *Primary Examiner.*

ALDRICH F. MEDBERY, *Examiner.*